United States Patent
Okamoto

(10) Patent No.: US 6,777,122 B2
(45) Date of Patent: Aug. 17, 2004

(54) VAPORIZER TEMPERATURE CONTROL IN FUEL CELL POWER PLANT

(75) Inventor: Masaru Okamoto, Yokosuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 268 days.

(21) Appl. No.: 10/151,943

(22) Filed: May 22, 2002

(65) Prior Publication Data

US 2002/0182465 A1 Dec. 5, 2002

(30) Foreign Application Priority Data

May 22, 2001 (JP) ....................................... 2001-152194

(51) Int. Cl.$^7$ ................................................ H01M 8/04
(52) U.S. Cl. .......................... 429/24; 429/17; 429/20; 429/22; 429/23
(58) Field of Search ............................. 429/24, 20, 17, 429/22, 23

(56) References Cited

U.S. PATENT DOCUMENTS 6,613,465 B2 * 9/2003 Yamaoka et al. ............. 429/13

FOREIGN PATENT DOCUMENTS

| EP | 0 798 798 A | 10/1997 |
|---|---|---|
| EP | 0 957 063 A | 11/1999 |
| EP | 1 014 464 A | 6/2000 |
| EP | 1 160 902 A | 12/2001 |
| EP | 1 211 744 A | 6/2002 |
| JP | 63-181270 | 7/1988 |
| JP | 4-15706 | 1/1992 |
| JP | 2000-178001 | 6/2000 |
| JP | 2000-185903 | 7/2000 |
| JP | 2000-357528 | 12/2000 |

* cited by examiner

*Primary Examiner*—John S. Maples
(74) *Attorney, Agent, or Firm*—McDermott Will & Emery LLP

(57) ABSTRACT

A fuel cell stack (8) generates power using hydrogen-rich gas obtained by reforming vaporized methanol in a reformer (6). The vaporized methanol is generated by vaporizing liquid methanol in a vaporizer (5). The vaporizer (5) is heated by combustion gas from a combustor (10). A sensor (31) detects a liquid methanol amount supplied to the vaporizer (5) by a methanol pump (4). A controller (100) calculates a prediction temperature of the vaporizer (5) based on the liquid methanol supply amount, and limits an increase of the liquid methanol supply amount from the methanol pump (4) so that the prediction temperature does not fall below a predetermined temperature (S7A, S7B). In this way, temperature drop of the vaporizer (5) from the predetermined temperature is prevented.

14 Claims, 7 Drawing Sheets

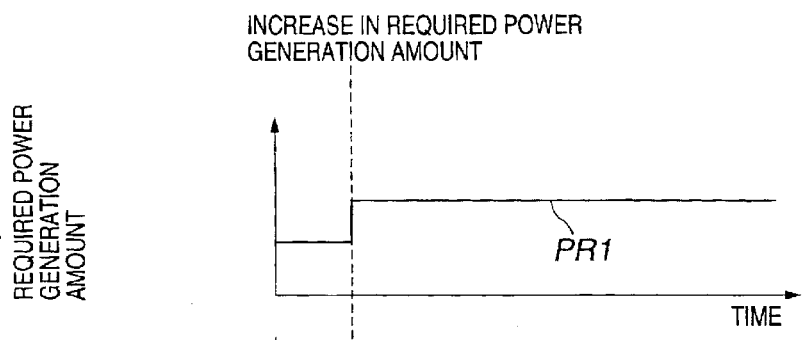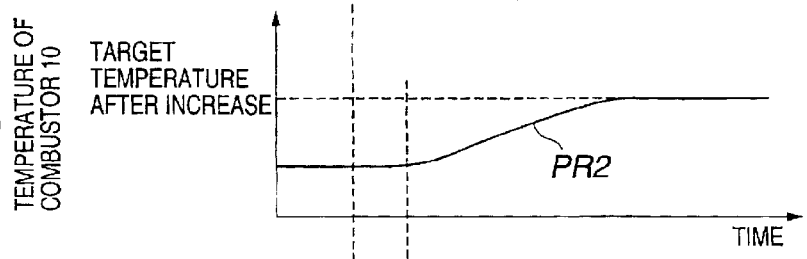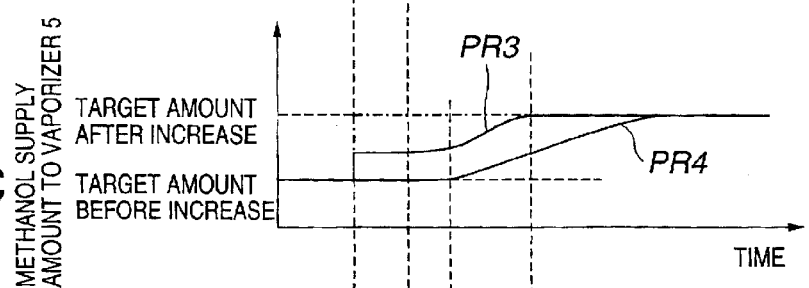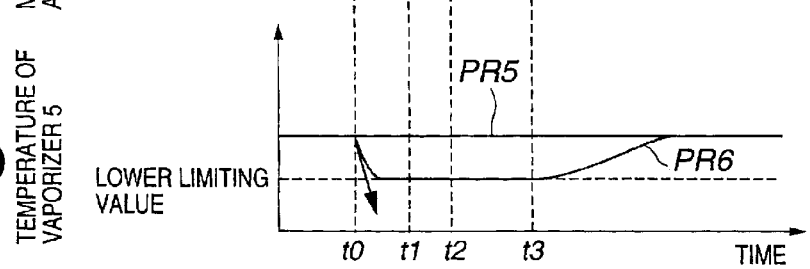

VAPORIZER TEMPERATURE CONTROL IN FUEL CELL POWER PLANT

FIELD OF THE INVENTION

This invention relates to temperature control of a vaporizer in a fuel cell power plant which uses reformate gas.

BACKGROUND OF THE INVENTION

Tokkai 2000-178001 and Tokkai 2000-185903 published by the Japanese Patent Office in 2000 disclose a temperature control of a vaporizer of a fuel cell power plant which uses reformate gas.

The fuel cell power plant is provided with a fuel cell stack which generates electricity by a reaction of reformate gas, a reformer which reforms vaporized fuel and generates reformate gas, a vaporizer which vaporizes liquid fuel, and a combustor which heats the vaporizer. The combustor burns anode effluent discharged from the anode of the fuel cell stack, and heats the vaporizer by combustion gas.

SUMMARY OF THE INVENTION

The temperature of the vaporizer depends on the combustion gas supplied from the combustor and the amount of liquid fuel to be vaporized. If there is a large amount of liquid fuel, i.e., if the load of the vaporizer is large, the temperature of the vaporizer will fall. In this case, if the supply amount of liquid fuel to the vaporizer is further increased in order to increase the anode effluent burnt by the combustor, the temperature of the vaporizer will decrease still further.

Hence, the above-mentioned prior art supplies supplementary fuel in addition to anode effluent to the combustor such that the temperature and amount of combustion gas supplied to the vaporizer can be controlled irrespective of the discharge amount of anode effluent.

Even in this case, after increasing the fuel amount supplied to the combustor, it will take time until the temperature of the vaporizer actually rises, and during this interval, the temperature of the vaporizer may fall below the temperature required to vaporize the fuel.

If the electric power generated by the fuel cell stack is insufficient due to the temperature decrease of the vaporizer, a secondary battery will discharge to compensate and the load of the secondary battery will increase.

Moreover, if the temperature of the vaporizer falls, part of the liquid fuel may flow into the reformer without vaporizing. The inflow of liquid fuel to the reformer reduces the reforming performance of the reformer, and increases generation of carbon monoxide in the reformer. Carbon monoxide poisons the fuel cell stack, and reduces the power generation performance of the fuel cell stack.

Thus, the temperature decrease of the vaporizer has an undesirable influence on the overall performance of the fuel cell power plant.

It is therefore an object of this invention to prevent the temperature of the vaporizer of a fuel cell power plant from falling below the temperature required to vaporize the fuel.

In order to achieve the above object, this invention provides a fuel cell power plant, comprising a vaporizer which applies heat to a liquid source material and generates a vaporized source material, a fuel cell stack which generates power using hydrogen-rich gas obtained from the vaporized source material, a device which supplies the liquid source material to the vaporizer, a sensor which detects a power generation requirement of the fuel cell stack, and a programmable controller programmed to calculate a liquid source material supply amount to the vaporizer based on the power generation requirement, calculate a prediction temperature of the vaporizer based on the supply amount of the liquid source material, and control the liquid source material supply amount supplied by the supply device so as to prevent the prediction temperature from falling below a predetermined temperature.

This invention also provides a method for controlling a liquid source material supply to a vaporizer of a fuel cell power plant. The fuel cell power plant comprises a fuel cell stack which generates power using hydrogen-rich gas obtained from a vaporized source material generated by the vaporizer. The vaporizer generates the vaporized source material by applying heat to the liquid source material. The fuel cell power plant further comprises a device which supplies the liquid source material to the vaporizer. The control method for controlling the liquid source material supply to the vaporizer comprises detecting a power generation requirement of the fuel cell stack, calculating a liquid source material supply amount to the vaporizer based on the power generation requirement, calculating a prediction temperature of the vaporizer based on the supply amount of the liquid source material, and controlling the liquid source material supply amount supplied by the supply device so as to prevent the prediction temperature from falling below a predetermined temperature.

The details as well as other features and advantages of this invention are set forth in the remainder of the specification and are shown in the accompanying drawings.

BRIEF DESCRIPTION OF THE DRAWINGS

FIGS. 3A–3D are timing charts describing the temperature change of a combustor and a vaporizer under the control by the controller.

DESCRIPTION OF THE PREFERRED EMBODIMENTS

Figure 1:
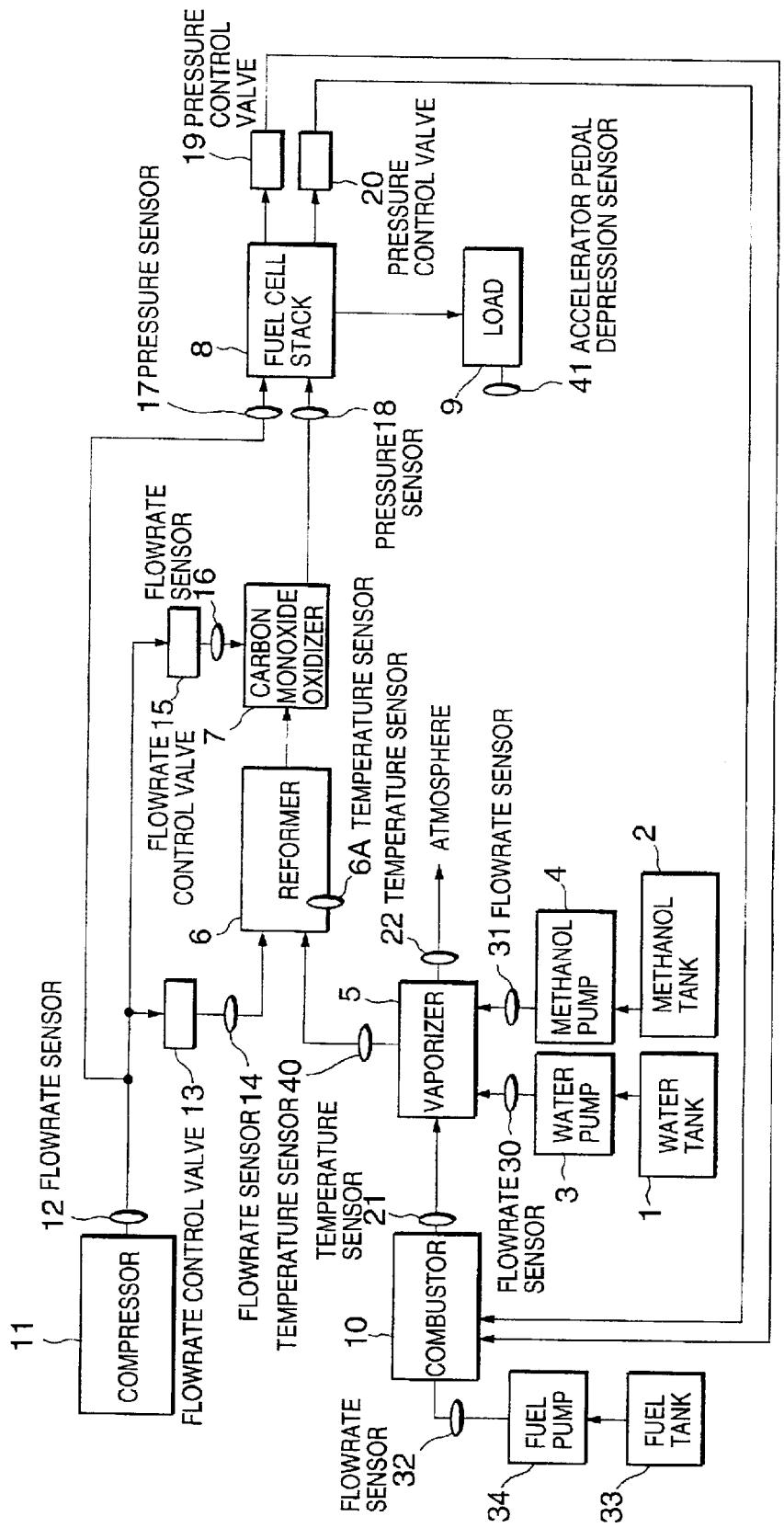
FIG. 1 is a schematic diagram of a fuel cell power plant according to this invention.

Referring to FIG. 1 of the drawings, a fuel cell power plant as a motive force source of a vehicle is provided with a fuel cell stack 8 which generates electricity by the reaction of hydrogen and air. The fuel cell stack 8 is a stack of so-called polymer electrolyte fuel cells which generate power using hydrogen-rich gas which contains a large amount of hydrogen, and air supplied from a compressor 11. The power generated by the fuel cell stack 8 is consumed by a load 9, such as an electric motor and a secondary battery.

The hydrogen-rich gas is generated from methanol and water. For this reason, the fuel cell power plant is provided with a water tank 1 and a methanol tank 2, a vaporizer 5 which vaporizes the water and methanol, a reformer 6 which generates reformate gas from the gaseous mixture of water vapor and methanol vapor, and a carbon monoxide oxidizer 7 which removes carbon monoxide (CO) from the reformate gas. It should be noted, however, that methanol may be replaced by gasoline or any liquid material containing hydrocarbons.

Water in the water tank 1 is supplied by a water pump 3 and methanol in the methanol tank 2 is supplied by a methanol pump 4, respectively, to the vaporizer 5, and respectively injected into the vaporizer 5 by injectors.

The vaporizer 5 vaporizes the water and methanol using the heat generated by a combustor 10.

The reformer 6 is known by U.S. Pat. No. 6,232,005 and performs steam reforming and partial oxidation reforming of the vaporized methanol. Specifically, the reformer 6 generates hydrogen by oxidizing methanol in the presence of an oxidation catalyst. This reaction is an exothermic reaction. On the other hand, the reforming reactor 6 makes methanol react with steam to generate hydrogen. This reaction is an endothermic reaction. In both reactions, reformate gas containing hydrogen is generated from the methanol. For the oxygen supply required for partial oxidation reforming and the temperature control of the reformer 6, air is supplied to the reformer 6 from a compressor 11 via a flowrate control valve 13.

The carbon monoxide oxidizer 7 performs catalytic combustion due to the preferential oxidation of the carbon monoxide in the reformate gas to generate hydrogen-rich gas with little carbon monoxide, using noble metal catalysts such as ruthenium (Ru) and platinum (Pt). To supply the oxygen required for catalytic combustion, air is supplied to the carbon monoxide oxidizer 7 from the compressor 11 via a flowrate control valve 15.

The fuel cell stack 8 discharges hydrogen-containing anode effluent and oxygen-containing cathode effluent as it generates electric power. The anode effluent is supplied via a pressure control valve 19 and the cathode effluent is supplied via a pressure control valve 20 respectively to the combustor 10. The combustor 10 burns the anode effluent and supplementary fuel supplied from a fuel tank 33 via a fuel pump 34 as required in the presence of the oxygen-containing cathode effluent, and supplies hot combustion gas to the vaporizer 5. Methanol can be used for the supplementary fuel.

Figure 2:
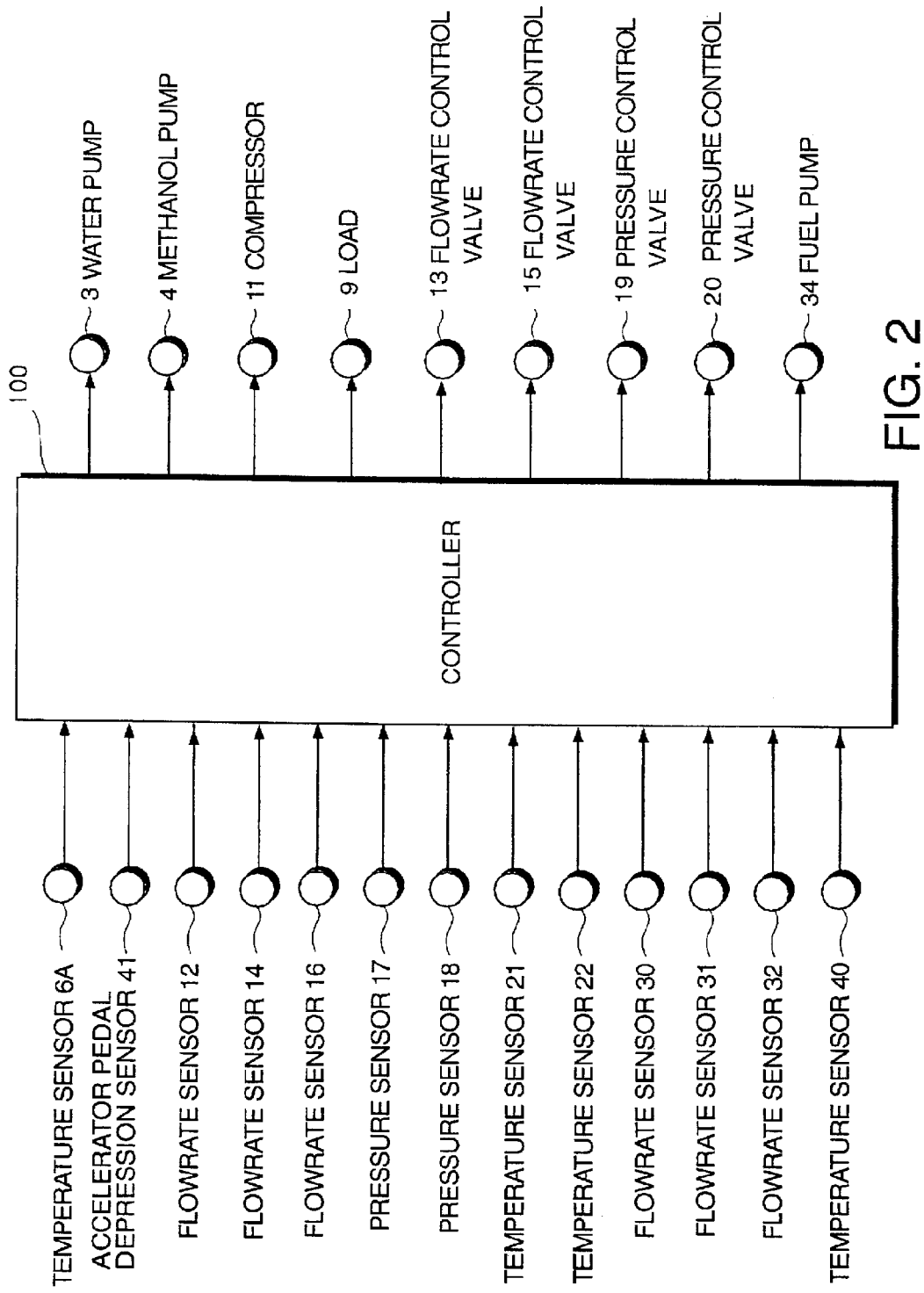
FIG. 2 is a block diagram describing the function of a controller according to this invention.

Referring to FIG. 2, the water supply amount from the water pump 3, the methanol supply amount from the methanol pump 4, the air supply amount from the compressor 11, the power consumption amount by the load 9, the flowrate of flow control valves 15, 16, the pressures of pressure control valves 19, 20 and the supplementary fuel supply amount from a fuel pump 34, are controlled by a programmable controller 100.

The controller 100 comprises a microcomputer provided with a central processing unit (CPU), read-only memory (ROM), random access memory (RAM) and input/output interface (I/O interface). The controller may also comprise two or more such microcomputers.

In order to perform the above control by the controller 100, the power plant is provided with the following sensors.

A flowrate sensor 14 which detects an air supply amount to the reformer 6, a flowrate sensor 16 which detects an air supply amount to the carbon monoxide oxidizer 7, a flowrate sensor 12 which detects an air supply amount of the compressor 11, a pressure sensor 17 which detects the pressure of the air supplied to the fuel cell stack 8, a pressure sensor 18 which detects the pressure of the hydrogen-rich gas supplied to the fuel cell stack 8, a temperature sensor 6A which detects the temperature of the reformer 6, a temperature sensor 40 which detects the temperature of the vaporizer 5, a flowrate sensor 30 which detects the water supply amount from the water pump 3, a flowrate sensor 31 which detects the methanol supply amount from the methanol pump 4, a flowrate sensor 32 which detects the supplementary fuel amount supplied to the combustor 10, a temperature sensor 21 which detects the temperature of the combustion gas supplied to the vaporizer 5 from the combustor 10, an accelerator pedal depression sensor 41 which detects a depression amount of an accelerator pedal with which the vehicle is provided, and a temperature sensor 22 which detects the temperature of the combustion gas discharged in the atmosphere after it has heated the vaporizer 5. The detected data are input into the controller 100 from respective sensors in the form of signals.

The controller 100 controls the air amount supplied to the reformer 6 and carbon monoxide oxidizer 7 from the compressor 11 by operating the flow control valves 13, 15. The controller 100 performs control so that the air pressure and hydrogen-rich gas pressure respectively become equal to target values suitable for power generation by operating the pressure control valves 19, 20. Since the compressor 11 supplies air to the fuel cell stack 8 as well as to the reformer 6 and carbon monoxide oxidizer 7, controlling the air pressure supplied to the fuel cell stack 8 also means controlling the air pressure supplied to the reformer 6 and carbon monoxide oxidizer 7.

The controller 100 also controls the air amount supplied to the fuel cell stack 8 as follows.

In the combustor 10, the anode effluent and supplementary fuel supplied by the fuel pump 34 are burnt in the presence of the oxygen containing cathode effluent. The amount of the cathode effluent is determined according to the air amount supplied to the fuel cell stack 8. Hence, the controller 100 determines the air amount to be supplied to the fuel cell stack 8 so that the air-fuel ratio of the gaseous mixture in the combustor 10 for burning coincides with a target air-fuel ratio.

The controller 100 also calculates the amount of water vapor and methanol vapor supplied to the reformer 6 from the methanol amount and water amount supplied to the vaporizer 5. The air amount required for the partial oxidation reaction of the reformer 6 and air amount required for the selective oxidation reaction of the carbon monoxide oxidizer 7 are then calculated from the amount of the water vapor and methanol vapor. Also, the air amount supplied to the reformer 6 is determined based on the detection temperature of the temperature sensor 6A so that the temperature of the reformer 6 is maintained within a temperature range suitable for the reforming reaction.

The controller 100 controls the rotation speed of the compressor 11 so that the total air supply amount detected by the flowrate sensor 12 is equal to the total air amount supplied to the reformer 6, the carbon monoxide oxidizer 7 and the fuel cell stack 8 determined in this way. Flow control valves 13, 15 are controlled so that the air amount requirement of the reformer 6 and carbon monoxide oxidizer 7 is satisfied.

The controller 100 also determines target amounts of water and methanol supplied to the vaporizer 5, based on the power generation amount of the fuel cell stack 8 required by the load 9, and controls the rotation speed of the water pump 3 and methanol pump 4 so that the water amount and methanol amount detected by the flowrate sensors 30, 31 coincide with the target supply amounts.

The controller 100 computes the electric power generation amount of the fuel cell stack 8 required by the load 9 based on the depression amount of the accelerator pedal detected by the accelerator pedal depression sensor 41, determines a target electric current consumption of the load 9 according to the depression amount of the accelerator pedal, and controls the load 9 so that the electric current consumption of the load 9 is equal to the target electric current consumption.

The controller 100 calculates the target temperature of the combustor 10 in order that the vaporizer 5 vaporizes the target supply amounts of methanol and water. The controller 100 further determines the target supplementary fuel supply amount to the combustor 10, and controls operation of the fuel pump 34 based on the target supplementary fuel supply amount so that this target temperature is realized. For this purpose, the controller 100 calculates the amount of anode effluent discharged from the fuel cell stack 8 from the methanol supply amount detected by the flowrate sensor 31.

However, when power generation demand increases sharply, the temperature of the combustor 10 does not rise immediately for the following reason. That is, the increase in the gaseous mixture of methanol and water supplied to the vaporizer 5 causes the temperature of the vaporizer 5 to fall. It also takes some time before the temperature rise and increased amount of combustion gas of the combustor 10 due to the increase in supplementary fuel supply to the combustor 10, raise the temperature of the vaporizer 5. In particular, when the temperature of the vaporizer 5 falls below the temperature required for vaporization of methanol, the methanol vapor supplied to the reformer 6 runs short, and it becomes impossible for the fuel cell stack 8 to satisfy the required power generation amount.

In order to prevent such a temperature drop of the vaporizer 5, the controller 100 predicts the temperature change of the vaporizer 5 based on the change in the methanol and water supplied to the vaporizer 5, and temporarily suppresses the supply of methanol and water to the vaporizer 5. At the same time, the supplementary fuel supply amount to the combustor 10 is increased. The controller 100 then increases the methanol and water supply to the vaporizer 5 as the temperature of the vaporizer 5 rises as a result of the above control.

The supply amounts of the methanol and water to the vaporizer 5 are respectively calculated from the methanol flowrate and water flowrate detected by the flowrate sensors 30, 31. The detection temperature of the temperature sensor 40 is used for the temperature of the vaporizer 5. However, the temperature sensor 40 may be omitted, and the temperature of the vaporizer 5 may instead be estimated from the combustion gas temperature detected by the temperature sensor 21 or the exhaust gas temperature detected by the temperature sensor 22. The detection temperature of the temperature sensor 21 is used for the temperature of the combustor 10. The flowrate detected by the flowrate sensor 32 is used for the supplementary fuel amount supplied to the combustor 10.

Next, the concept of this control will be described referring to FIGS. 3A–3D.

Referring to FIG. 3A, at a time t0, the required power generation amount of the fuel cell stack 8 increases as shown by a straight line PR1. The methanol amount supplied to the vaporizer 5 corresponding to this increase also increases as shown by the dotted line of FIG. 3C. However, if the methanol supply amount is sharply increased, the temperature of the vaporizer 5 will fall below a lower limiting temperature as shown by the arrow in FIG. 3D. The lower limiting temperature is the minimum temperature required by the vaporizer 5 to vaporize methanol, and is set to a value in the range of 80° C.-120° C. Here, the minimum value is set to 95° C.

On the other hand, at the time t0, the supplementary fuel supply amount to the combustor 10 which supplies combustion gas to the vaporizer 5 increases corresponding to the increase in the required power generation amount, and the temperature of the combustion gas of the combustor 10 gradually increases from a time t1 behind the increase in the supplementary fuel supply amount as shown by the curve PR2 of FIG. 3B.

If the methanol supply amount is gradually increased from a time t2, so that the temperature rise in the vaporizer 5 due to this change of combustion gas and the temperature drop due to increase of methanol supply to the vaporizer 5 cancel each other out as shown by the curve PR4 in FIG. 3C, the temperature of the vaporizer 5 does not vary as shown by the line PR5 of FIG. 3D. Therefore, if stability of the performance of the vaporizer 5 is to be emphasized, it is preferable to control the methanol supply amount to the vaporizer 5 as shown by the curve PR4 of FIG. 3C.

On the other hand, to increase the methanol supply amount in a short time, the methanol supply amount should be increased to a certain extent at the time t0, and the methanol supply amount should then be gradually increased further from the time t2, as shown by the curve PR3 in FIG. 3C. In this case, the temperature of the vaporizer 5 falls due to the increase in methanol supply amount at the time t0, as shown by the curve PR6 in FIG. 3D, but even in this case, the temperature does not fall below the lower limiting temperature.

At a time t3 when the methanol supply amount reaches the target value, the temperature of the vaporizer 5 begins to rise, and finally returns to the initial temperature. In this way, by controlling the methanol supply amount to the vaporizer 5 as shown by the curve PR3 of FIG. 3C, the power generation amount of the fuel cell stack 8 is made to coincide with the required power generation amount in the short time in which the methanol vaporization performance of the vaporizer 5 is not impaired.

In other words, when the performance stability of the vaporizer 5 is to be emphasized, it is preferable to apply the former control method. When it is desired to emphasize an early increase of the power generation amount of the fuel cell stack 8, it is preferred to apply the latter control method.

Figure 5:
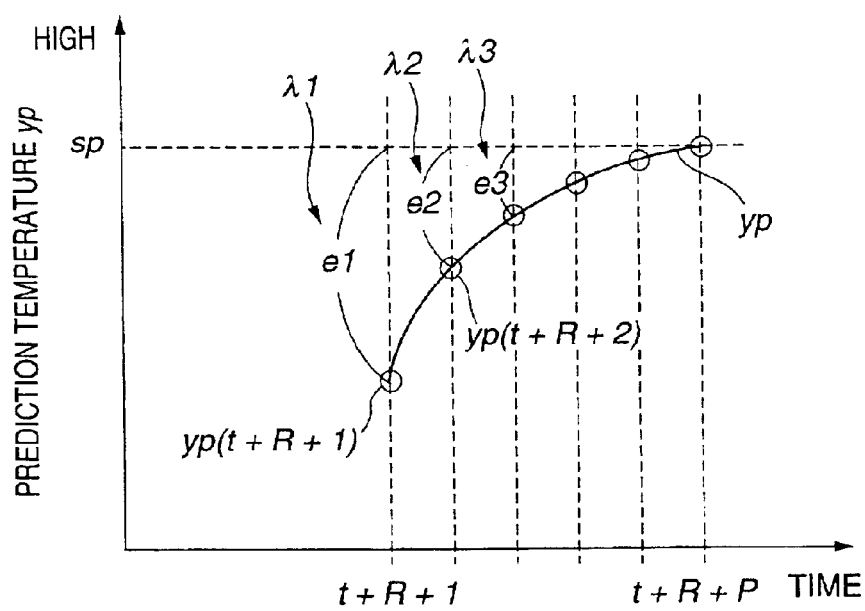
FIG. 5 is a diagram describing a weighting coefficient λ applied by the controller.
Figure 6:
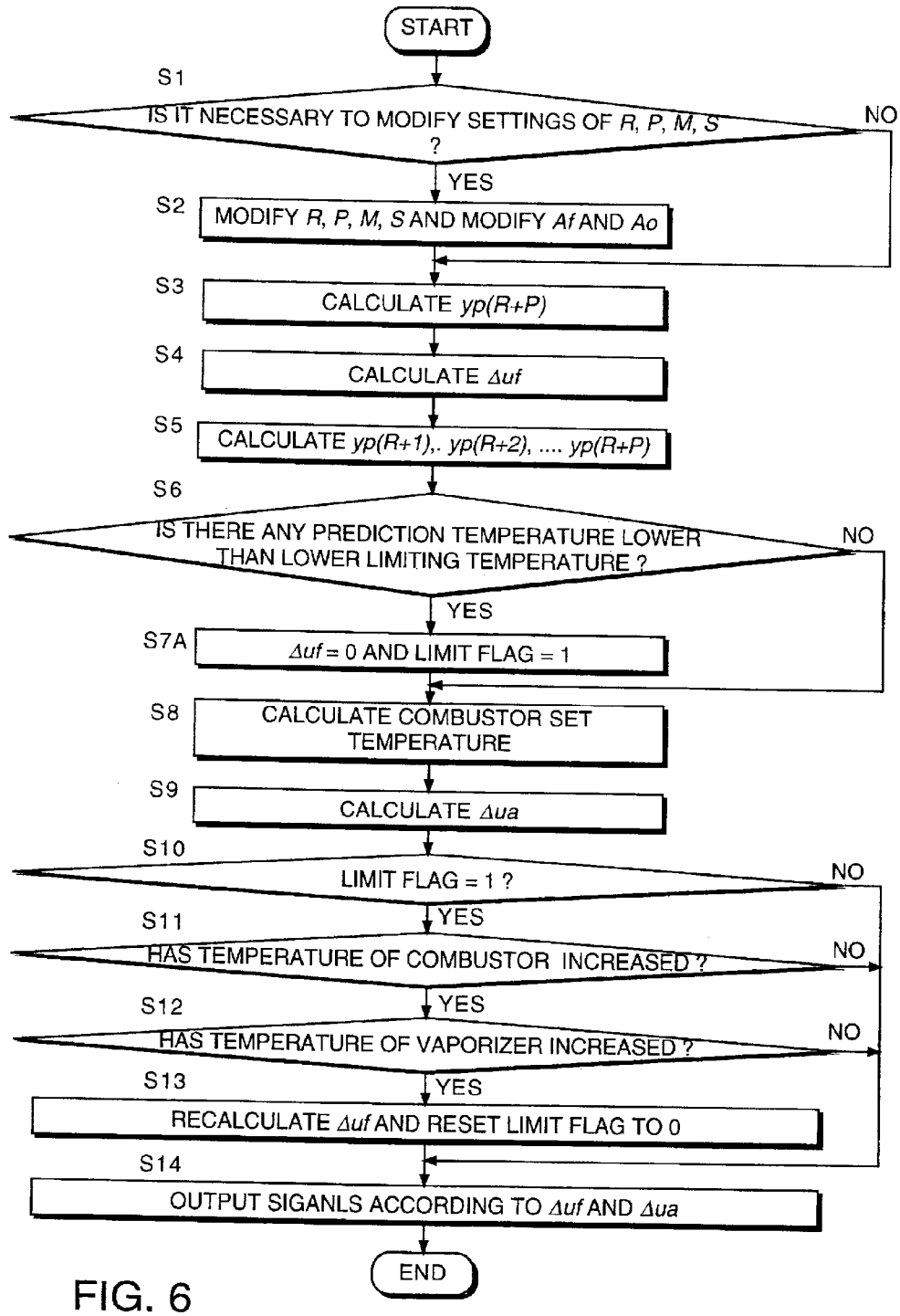
FIG. 6 is a flowchart describing a vaporizer temperature control routine performed by the controller.

Next, referring to FIGS. 4–6, the processing performed by the controller 100 to achieve the above control will be described.

The algorithm of this control can be applied to either of the former control or the latter control simply by changing the value of a weighting coefficient.

Figure 4:
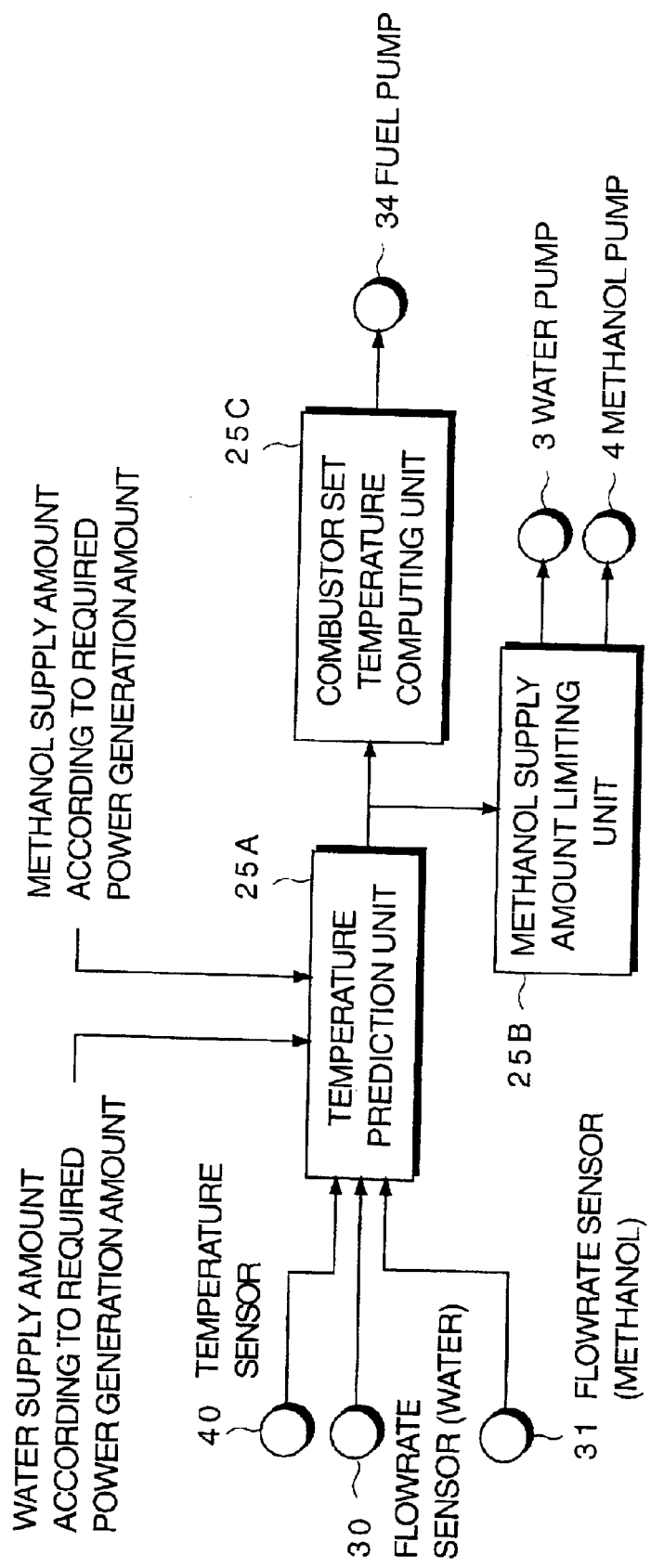
FIG. 4 is a block diagram describing the temperature control function of the controller.

First, referring to FIG. 4, the controller 100 comprises a temperature prediction unit 25A, methanol supply amount limiting unit 25B and combustor set temperature computing unit 25C. These units show the functions of the controller 100 comprising a microcomputer as virtual units, and are not physical entities.

First, the temperature prediction unit 25A predicts the temperature variation of the vaporizer 5 when a methanol amount according to the required power generation amount of the fuel cell stack 8 is supplied to the vaporizer 5. Specifically, the water supply amount and methanol supply amount depending on the required power generation amount are compared with the real supply amounts detected by the flowrate sensors 30, 31, and their increase amounts are calculated. Next, the temperature of the vaporizer 5 after the increase of these supply amounts is predicted using the computed water increase amount and methanol increase amount, and the temperature of the vaporizer 5 detected by the temperature sensor 40. This temperature is referred to as the prediction temperature.

Next, the prediction temperature is compared with the lower limiting temperature. The lower limiting temperature is set to 95° C. as described above. When the prediction temperature does not fall below the lower limiting temperature, there is no need to limit the methanol supply amount to the vaporizer 5. On the other hand, when the prediction temperature falls below the lower limiting temperature, the methanol supply amount limiting unit 25B and combustor set temperature computing unit 25C perform the following processing.

The methanol supply amount limiting unit 25B controls the operation of the water pump 3 and methanol pump 4 so that the temperature of the vaporizer 5 does not fall below the lower limiting temperature, and limits the amounts of water and methanol supplied to the vaporizer 5 to values below the water and methanol supply amounts corresponding to the required power generation amount.

The combustor set temperature computing unit 25C calculates the required temperature of the combustion gas supplied by the combustor 10 to the vaporizer 5 based on the required power generation amount. As a result, an amount of supplementary fuel corresponding to the required temperature is supplied to the combustor 10.

The controller 100 performs the above processing repeatedly at a predetermined interval, e.g., a hundred milliseconds to one second depending on the performance of the controller 100. In the following description, the predetermined interval is set to a hundred milliseconds.

Regarding the prediction temperature which is the basis of this control, it is naturally desirable that the calculation precision is high, but to mitigate the computation load on the controller 100, it is necessary to limit the number of data which is used for the prediction. Also, the number of data required for calculating the prediction temperature varies according to the running conditions of the fuel cell stack 8.

In this fuel cell power plant, the number of prediction data is represented by a parameter P and the prediction period is represented by a parameter R, both of which are positive integers. Let the time at which prediction is performed be an integer t. The prediction interval is unity. Taking the number of prediction temperatures as P, the prediction period is from a time t+R+1 to a time t+R+P. In other words, at the time t, P temperatures are predicted from the time t+R+1 to the time t+R+P. The values of the parameter P and the parameter R vary according to the running conditions of the fuel cell stack 8.

To predict these temperatures, estimated data for the methanol supply amount to the vaporizer 5 after the time t and actual data for the methanol supply amount to the vaporizer 5 before the time t are necessary. This is because the methanol supplied before the time t may remain in the liquid state at the time t, and vaporizes after the time t. This methanol can be a cause of the temperature drop of the vaporizer 5 after the time t.

The number of data required for temperature prediction is represented by a parameter S and a parameter M. The parameter M represents the number of actual data for the methanol supply amount to the vaporizer 5 before the time t, and the parameter S represents the number of estimated data for the methanol supply amount to the vaporizer 5 after the time t. The parameter S may be zero or a positive integer. The parameter M is a positive integer which does not exceed the sum of the parameters R and P.

Therefore, the data used for temperature prediction comprise actual data for the methanol supply amount from the time t−S to the time t−1, and estimated data for the methanol supply amount from the time t to the time t+M−1. The values of the parameters S, M are also made to vary according to the running conditions of the fuel cell stack 8.

As an example of the characteristics of the parameters R, P, M and S with respect to the running conditions of the fuel cell stack 8, the parameters P, R and S are set to larger values while the parameter M is set to a smaller value as the required power generation amount of the fuel cell stack 8 increases.

Regarding the parameters P, R, S, M, optimum values are preset by experiment relative to various running conditions of the fuel cell stack 8, and previously stored in the memory of the controller 100.

Each time a temperature prediction is made, the controller 100 reads and applies from a table which stores the values of the parameters P, R, S, M according to the running conditions of the fuel cell stack 8.

Next, the technique of temperature prediction performed by the temperature prediction unit 25A will be described.

A known model prediction control theory is applied to this temperature prediction. When the model prediction control theory is applied to the temperature prediction of the vaporizer 5, the following Equations are obtained.

$$yp = y + Af \cdot \Delta uf + Ao \cdot \Delta uo \quad (1)$$

The variables in Equation (1) can be represented by a (2)–(5) determinant.

yp is a prediction temperature of the vaporizer 5 represented by the following determinant.

$$yp = [yp(t+R+1), yp(t+R+2), yp(t+R+3), \ldots, yp(t+R+P)]^T \quad (2)$$

y is a measurement temperature of the same represented by the following determinant.

$$y = [y(t), y(t), y(t), y(t), \ldots, y(t)]^T \quad (3)$$

Δuf is a prediction methanol supply variation amount represented by the following determinant.

$$\Delta uf = [\Delta u(t), \Delta u(t+1), \Delta u(t+2), \ldots, \Delta u(t+M-1)]^T \quad (4)$$

Δuo is a measured methanol supply variation amount represented by the following determinant.

$$\Delta uo = [\Delta u(t-1), \Delta u(t-2), \Delta u(t-3), \ldots, \Delta u(t-S)]^T \quad (5)$$

In the above Equations, Af is a model coefficient of P columns and M rows, Ao is a model coefficient of P columns and S rows, D is a difference, T is a transpose of a matrix, t is the present time, and R, P, M, S are the aforesaid parameters.

As shown by Equation (2), a prediction temperature yp is expressed by a matrix of P columns and one row having the P prediction temperatures from the time t+R+1 to the time t+P as elements. The measured temperature y, as shown by Equation (3), can be represented by a matrix of P columns and 1 row having the present temperature of the vaporizer 5 detected by the temperature sensor 40 as elements.

The prediction methanol supply variation amount Δuf, as shown by Equation (4), can be represented by a matrix of M columns and 1 row having the methanol supply amounts predicted from the time t to the time t+M−1 as elements. The measured variation amount Δuo can be represented by a determinant having the measured methanol supply amounts from the time t−1 to the time t−S as elements. The prediction methanol supply variation amount Δuf and measured variation amount Δuo both show variation amounts each time the process is executed.

The model coefficient Af is represented by a matrix of P columns and M rows, and it shows to what extent the prediction methanol supply variation amount Δuf is reflected in the prediction temperature. The model coefficient Ao is a matrix of P columns and S rows, and shows to what extent the measured variation amount Δuo is reflected in the prediction temperature yp. The model coefficient Af and model coefficient Ao depend on the model parameters R, P, M, S.

The time interval may be set in various units, but here, it is set to a hundred milliseconds which is equal to the process execution interval. Therefore, the time t+R means 0.1·R seconds after the time t.

To obtain the prediction temperature yp, the prediction methanol supply variation amount Δuf is required in addition to the existing variation amount Δuo which is a measured value, and the measured temperature y. The Temperature prediction unit 25A calculates the prediction methanol supply variation amount Δuf by the following Equations (6)–(8).

$$\Delta uf = \frac{Af^T \cdot \lambda \cdot (sp - y - Ao \cdot \Delta uo)}{Af^T \cdot \lambda \cdot Af + \Phi} \quad (6)$$

Where, $sp$ = target temperature of vaporizer 5, $\Phi$ = weighting coefficient which adjusts the shift in    (7)
the methanol supply amount
= diag[$\Phi 1, \Phi 2, \Phi 3, \ldots, \Phi M$]

$\lambda$ = weighting coefficient relating to the discrepancy    (8)
between the prediction value and the target value
= diag[$\lambda 1, \lambda 2, \lambda 3, \ldots, \lambda P$]

diag [. . . ] in Equations (7) and (8) represents a diagonal matrix.

Equation (6) corresponds to Equation (1) solved for Δuf. More specifically, Equation (6) is set by the least square method so as to minimize the sum of differences between the target temperature sp of the vaporizer 5 and the prediction temperatures yp at each time from the time t+R+1 to the time t+R+P. In other words, it is a differential form of $(sp-yp)^2$.

The prediction methanol supply variation amount Δuf can also be calculated other than by the least square method such as by the linear programming method.

As can be seen from Equation (6), to calculate the prediction variation amount Δuf, several parameters are required in addition to the aforesaid model coefficient Af and model coefficient Ao. The target temperature sp which is one of these parameters is represented by a matrix having the required temperature of the vaporizer 5 relative to the required power generation amount of the fuel cell stack 8 as elements.

Next, the weighting coefficient Φ and weighting coefficient λ will be described referring to FIG. 5.

As can be seen from Equation (8), the weighting coefficient λ is represented by a diagonal matrix having λ1 to λP as elements which specify the weighting relative to the difference between the target temperature sp and prediction temperature yp. As shown in FIG. 5, if i is a natural number from 1 to P, the coefficient λi represents a weighting relative to a difference ei between the target temperature sp and the prediction temperature yp(t+R+i) at the time t+R+i.

When the methanol supply amount to the vaporizer 5 largely varies, the temperature of the vaporizer 5 also largely varies, and the detection temperature of the temperature sensor 40 can no longer follow the actual temperature variation. When this situation occurs, the reliability of the temperature measurement value decreases and the temperature control may not be performed properly. Hence, a weighting is applied to the difference using the weighting coefficient λ so that the variation of the methanol supply amount does not exceed the tracking rate of the temperature sensor 40. The weighting coefficient λ is determined from experiment or by a simulation and previously stored in the memory of the controller 100.

As can be seen from Equation (7), the weighting coefficient Φ is represented by a diagonal matrix with Φ1 to ΦM as elements which specify the weighting relative to the methanol supply amount variation.

If the weighting coefficient λ is set to diag[1,0,0, . . . 0], the prediction methanol supply variation amount Δuf that makes the prediction value yp (t+R+1) of the temperature at the time t+R+1 coincide with the target temperature sp, can be calculated. Also, regarding diag[λ1, λ2, λ3, . . . λP], when λi is set to a larger value than zero, the prediction methanol supply variation amount Δuf that makes all the P prediction temperatures from the time t+R+1 to the time t+R+P coincide with the target temperature sp, is calculated. The difference between these weighting coefficients λ corresponds to the difference between the curve PR3 and the curve PR4 in FIG. 3C. Therefore, by selecting the value of the weighting coefficient λ, any of the characteristics of the curve PR3 and the curve PR4, or any desired characteristics between them, can be realized.

As shown in Equation (4), the prediction methanol supply variation amount Δuf obtained by solving Equation (6) includes the variation amounts predicted from the time t to the time t+M−1 as elements. By substituting this prediction methanol supply variation amount Δuf into Equation (1), the temperature variation of the vaporizer 5 relative to the prediction methanol supply variation amount Δuf can be predicted.

Next, referring to FIG. 6, the vaporizer temperature control routine performed by the controller 100 will be described based on the above algorithm. The execution interval of the routine is a hundred milliseconds as described above. This routine corresponds to the processing performed by the temperature prediction unit 25A, the methanol supply amount limiting unit 25B and the combustor set temperature computing unit 25C of FIG. 4.

First, in a step S1, the controller 100 determines whether or not it is necessary to modify the settings of the parameters R, P, M, S based on the running conditions of the fuel cell stack 8.

When modifications are necessary, in a step S2, the parameters R, P, M and S are modified, and the coefficients Af, Ao are recalculated at the same time.

After the processing of the step S2, the controller 100 performs processing of a step S3. When it is determined in the step S1 that modifications of the settings of the parameters R, P, M, S are unnecessary, the controller 100 skips the step S2 and performs the processing of the step S3.

In the step S3, the controller 100 calculates the prediction temperature yp(R+P) of the vaporizer 5 at a time R+P when the present methanol supply amount to the vaporizer 5 is maintained from Equation (1). Specifically, the measured variation amount Δuo and measured temperature y at the present time are substituted into Equation (1), and the prediction temperature yp(R+P) is calculated. Herein the prediction temperature yp(R+P) can be interpreted as the temperature of the vaporizer 5 after the variation in the temperature of combustor 10 has converged.

In a next step S4, the controller 100, using Equation (6), calculates a new prediction methanol supply variation amount Δuf from the prediction temperature yp(R+P) and target temperature sp determined according to the required power generation amount.

In a next step S5, the controller 100 calculates the prediction temperature of the vaporizer 5 from the time R+1 to the time R+P by substituting the new prediction methanol supply variation amount Δuf into Equation (1). As a result, a variation curve of the prediction temperature is obtained corresponding to the curve PR3 or the curve PR4 of FIG. 3C. The steps S1-S5 correspond to the function of the temperature prediction unit 25A of FIG. 4.

In a next step S6, the controller 100 determines whether or not any of the prediction temperatures calculated in the step S5 is lower than the lower limiting temperature. If none of the prediction temperatures is lower than the lower limiting value, the temperature of the vaporizer 5 will not fall below the lower limiting value if the new prediction methanol supply variation amount Δuf is realized. In this case, the controller 100 performs the processing of a step S8. On the other hand, when any of the prediction temperatures is lower than the lower limiting value, the controller 100 performs the processing of a step S7A.

In the step S7A, the controller 100 sets the prediction methanol supply variation amount Δuf to zero so as to suppress increase of the methanol supply amount. As a result, the present methanol supply amount is maintained as it is. Also, a limit flag which shows that the prediction methanol supply variation amount Δuf has been limited, is set to unity. The initial value of this limit flag is zero. The step S7A corresponds to the function of the methanol supply amount limiting unit 25B.

In the next step S8, the controller 100 calculates the set temperature of the combustor 10. The set temperature is calculated based on the required power generation amount of the fuel cell stack 8. However, in order to quickly increase the methanol supply amount, the temperature of the combustor 10 may also be set to a higher value than the calculated value.

Further, when the set temperature of the combustor 10 is set to a higher value than the calculated value, it is preferred that the set temperature is determined so that the difference between the set temperature and calculated value is larger, the larger the difference between the lower limiting temperature and the prediction temperature of the vaporizer 5. By setting the set temperature in this way, the temperature of the vaporizer 5 can be quickly increased. In this calculation, a feedback control algorithm is for example used. Specifically, the set temperature is corrected so that the difference between the lower limiting temperature and the prediction temperature of the vaporizer 5 is zero. The step S8 corresponds to the function of the combustor set temperature computing unit 25C.

In a next step S9, the controller 100 calculates a variation amount of the supplementary fuel supplied to the combustor 10 based on the set temperature of the combustor 10 set in the step S8.

In the steps 8 and 9, instead of the feedback control algorithm, a model can also be constructed showing the relation between the variation amount in the supplementary fuel supplied to the combustor 10 and the temperature variation of the vaporizer 5, and the variation amount of the supplementary fuel supplied to the combustor 10 calculated based on this model.

The relation between the variation amount of the supplementary fuel supplied to the combustor 10 and the temperature variation of the vaporizer 5 may be represented by the following Equation (9) based on system identification theory.

$$\Delta ya = G(s) \cdot \Delta ua \quad (9)$$

where, Δya=temperature variation of the vaporizer 5,
Δua=variation amount of supplementary fuel supply to the combustor 10, and
G(s)=transfer function.

$$G(s) = \frac{K}{a \cdot s + 1} \quad (10)$$

where, $K$ = process gain,
$a$ = slope, and
$s$ = Laplacian operator.

If the process gain K and slope a are first found by a step response experiment, and the difference between the target temperature of the vaporizer 5 and present temperature is substituted into Δya of Equation (9), the variation amount Δua of the supplementary fuel supply amount to the combustor 10 required to make the temperature of the vaporizer 5 equal to the lower limiting value, can be calculated.

After calculating the variation amount Δua of the supplementary fuel supply amount to the combustor 10 by any of the above methods, in a step S10, the controller 100 determines whether or not the limit flag is unity. When the limit flag is unity as described above, it shows that the prediction methanol supply variation amount Δuf has been limited.

When the limit flag is unity, in a step S11, the controller 100 compares the temperature of the combustor 10 when the limit flag was changed from zero to unity, with the present temperature of the combustor 10. If the temperature of the combustor 10 increases after the limit flag changed from zero to unity, in a step S12, the controller 100 compares the temperature of the vaporizer 5 when the limit flag changed from zero to unity, with the present temperature of the vaporizer 5.

If the temperature of the vaporizer 5 increased after the limit flag changed from zero to unity, in a step S13, the controller 100 releases the limit on the prediction methanol supply variation amount Δuf and resets the limit flag to zero.

The variation amount of the methanol supply amount to the vaporizer 5 after releasing the limit is set to a value with which the temperature fall is cancelled out by the temperature rise of the vaporizer 5 due to the temperature rise of the combustor 10, or to a smaller value than this. If the variation amount of the methanol supply amount after releasing the limit is determined in this way, the methanol supply amount can be increased within a range which does not cause temperature drop of the vaporizer 5.

In a next step S14, the controller 100 outputs signals based on the variation amount of the methanol supply amount determined by the above process to the methanol pump 4 and water pump 3, and outputs a signal to the fuel pump 34 corresponding to the variation amount of the supplementary fuel supply amount to the combustor 10.

If on the other hand, when the limit flag is not unity in the step S10, or the temperature of the combustor 10 is not increased after the limit flag was changed from zero to unity in the step S11, or the temperature of the vaporizer 5 has not increased after the limit flag was changed from zero to unity in the step S12, it is possible that the temperature of the vaporizer 5 has decreased due to variation of the prediction methanol supply variation amount Δuf. Therefore, in any of the above cases, the controller 100 performs processing of the step S14 so that the prediction methanol supply variation amount Δuf retains its limited value.

According to this routine, when any of the prediction temperatures in the step S6 is lower than the lower limiting temperature, the prediction methanol supply variation amount Δuf is limited to zero, and the controller 100 outputs a maintenance signal to the methanol pump 4 and water pump 3 not to increase the supply amount of methanol and water to the vaporizer 5.

On the other hand, when the variation amount of the methanol supply amount is not limited, signals corresponding to the prediction methanol supply variation amount Δuf calculated in the step S4 are respectively output to the methanol pump 4 and water pump 3.

Further, in the case where the limit flag was once set to unity in the step S7A and then reset to zero in the step S13, the signals corresponding to the prediction methanol supply variation amount Δuf recalculated in the step S13 are output to the methanol pump 4 and water pump 3 in the step S14.

According to this embodiment, in the step S7A, the prediction methanol supply variation amount Δuf is limited to zero so temperature control corresponding to the characteristics of the curve PR4 of FIG. 3 is performed.

Next, a second embodiment of this invention will be described referring to FIG. 7.

This embodiment relates to a temperature control routine for performing temperature control corresponding to the characteristics of the curve PR3 in FIG. 3C. Instead of the routine of FIG. 6 of the first embodiment, the controller 100 performs the routine shown in FIG. 7.

Figure 7:
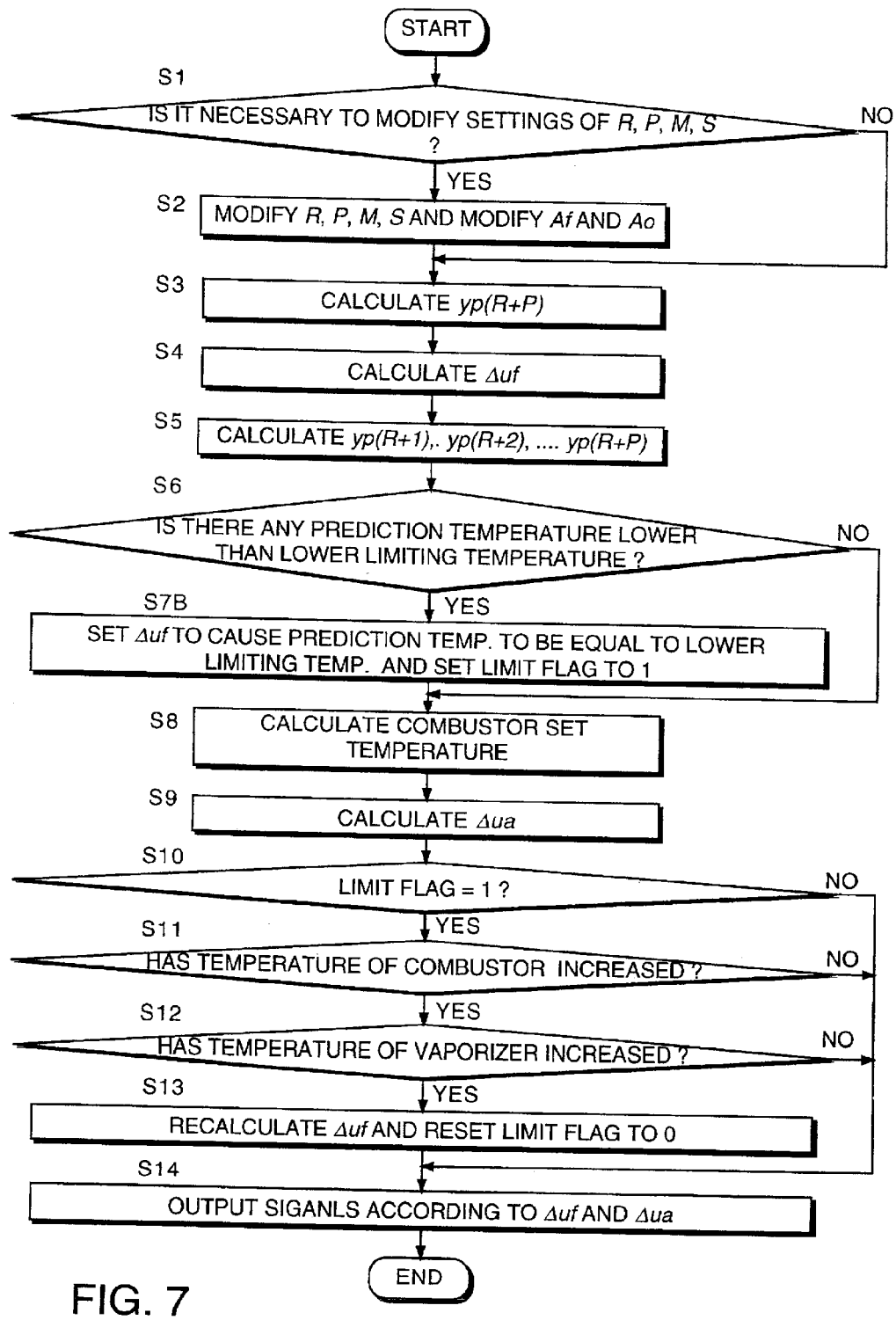
FIG. 7 is similar to FIG. 6, but showing a second embodiment of this invention.

Referring to FIG. 7, in this embodiment, a step S7B is provided instead of the step S7A of the first embodiment. The remaining features of the routine and the hardware of the fuel cell power plant are identical to those of the first embodiment.

In the step S7B, the controller 100 updates the prediction methanol supply variation amount Δuf so that the prediction temperature of the vaporizer 5 found in the step S5 coincides with the lower limiting temperature. This processing corresponds to setting the target temperature sp equal to the lower limiting temperature and repeating the calculation of the step S4. This calculation can also be performed using Equation (9) based on system identification theory.

According to this embodiment, the temperature of the vaporizer 5 varies in the following manner. The temperature of the vaporizer 5 drops due to increase in the methanol amount supplied to the vaporizer 5, but due to the increase of the supplementary fuel amount supplied to the combustor 10, the increase in the methanol supply amount is allowed within a range in which the temperature of the vaporizer 5 does not fall below the lower limiting temperature. As the temperature of the combustor 10 approaches the target temperature, the increase amount of the methanol supply amount to the vaporizer 5 also increases. In other words, the methanol supply amount increases while the temperature of the vaporizer 5 maintains the lower limiting temperature.

When the methanol supply amount reaches the target supply amount, the temperature of the vaporizer 5 is equal to the lower limiting value, but due to the subsequent temperature rise of the combustor 10, the temperature of the vaporizer 5 finally reaches the target temperature.

It is possible that if control is performed so that the prediction temperature of the vaporizer 5 coincides completely with the lower limiting temperature, the temperature of the vaporizer 5 may drop below the lower limiting temperature instantaneously due to some reason in the process whereby the temperature of the vaporizer 5 converges to the target temperature. To avoid such a situation, it is desirable to give some tolerance to the lower limiting temperature. Specifically, the calculated lower limiting temperature is set to be slightly higher than the minimum temperature required to vaporize the methanol.

As described above, according to this invention, a limit is applied to the increase of methanol supply amount based on the prediction temperature of the vaporizer 5, so the temperature of the vaporizer 5 of the fuel cell power plant can always be maintained at a suitable temperature for methanol vaporization.

The contents of Tokugan 2001-152194, with a filing date of May 22, 2001 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. A fuel cell power plant, comprising:
   a vaporizer which applies heat to a liquid source material and generates a vaporized source material;
   a fuel cell stack which generates power using hydrogen-rich gas obtained from the vaporized source material;
   a device which supplies the liquid source material to the vaporizer;
   a sensor which detects a power generation requirement of the fuel cell stack; and
   a programmable controller programmed to:
      calculate a liquid source material supply amount to the vaporizer based on the power generation requirement;
      calculate a prediction temperature of the vaporizer based on the supply amount of the liquid source material; and
      control the liquid source material supply amount supplied by the supply device so as to prevent the prediction temperature from falling below a predetermined temperature.

2. The fuel cell power plant as defined in claim 1, wherein the predetermined temperature is set equal to a minimum temperature at which the vaporizer can vaporize the liquid source material supplied thereto.

3. The fuel cell power plant as defined in claim 1, wherein the fuel cell power plant further comprises a temperature sensor which detects a temperature of the vaporizer, and the predetermined temperature is set equal to the temperature detected by the temperature sensor.

4. The fuel cell power plant as defined in claim 1, wherein the controller is further programmed to control the liquid source material supply amount of the supply device so that the prediction temperature does not fall below the predetermined temperature, by suppressing increase of the liquid source material supply amount of the supply device.

5. The fuel cell power plant as defined in claim 4, wherein the controller is further programmed to calculate an increase amount of the liquid source material supply amount based on the power generation requirement, calculate plural prediction temperatures of the vaporizer in a time sequence corresponding to the increase amount, and suppress increase of the liquid source material supply amount of the supply device when any one of the plural prediction temperatures is lower than the predetermined temperature.

6. The fuel cell power plant as defined in claim 1, wherein the fuel cell power plant further comprises a combustor which provides heat to the vaporizer, and the controller is further programmed to control the combustor to cause the temperature of heat which the combustor provides to the vaporizer to increase as the power generation requirement increases.

7. The fuel cell power plant as defined in claim 6, wherein the controller is further programmed to calculate a set temperature of the heat which the combustor provides to the vaporizer according to the power generation requirement, correct the set temperature to a corrected temperature which eliminates a difference between the predetermined temperature and the prediction temperature, and control the combustor to cause the temperature of the heat which the combustor provides to the vaporizer to be equal to the corrected temperature.

8. The fuel cell power plant as defined in claim 1, wherein the fuel cell power plant further comprises a sensor which detects a temperature of the vaporizer, and the controller is further programmed to store a record of an actual liquid source material supply amount supplied to the vaporizer, calculate a new liquid source material supply amount based on a target temperature determined based on the required power generation amount, the record of the actual source material supply amount and the temperature of the vaporizer, and calculate the prediction temperature based on the new liquid source material supply amount.

9. The fuel cell power plant as defined in claim 8, wherein the fuel cell power plant further comprises a combustor which provides heat to the vaporizer using combustion gas from supplementary fuel, and the temperature sensor comprises a sensor which detects a temperature of the combustion gas.

10. The fuel cell power plant as defined in claim 1, wherein the controller is further programmed to limit an increase of the liquid source material supply amount when the prediction temperature is lower than the predetermined temperature.

11. The fuel cell power plant as defined in claim 10, wherein the fuel cell power plant further comprises a sensor which detects a temperature of the vaporizer, and the controller is further programmed not to limit the increase of the liquid source material supply amount when the temperature of the vaporizer rises while the liquid source material supply amount of the supply device is limited.

12. The fuel cell power plant as defined in any one of claim 1 through claim 11, wherein the liquid source material is a fuel containing carbon and hydrogen, and the fuel cell power plant further comprises a reformer which reforms vaporized source material to obtain hydrogen-rich gas.

13. A fuel cell power plant, comprising:
a vaporizer which applies heat to a liquid source material and generates a vaporized source material;
a fuel cell stack which generates power using hydrogen-rich gas obtained from the vaporized source material;
a device which supplies the liquid source material to the vaporizer;
means for detecting a power generation requirement of the fuel cell stack;
means for calculating a liquid source material supply amount to the vaporizer based on the power generation requirement;
means for calculating a prediction temperature of the vaporizer based on the supply amount of the liquid source material; and
means for controlling the liquid source material supply amount supplied by the supply device so as to prevent the prediction temperature from falling below a predetermined temperature.

14. A method for controlling a liquid source material supply to a vaporizer of a fuel cell power plant, the fuel cell power plant comprising a fuel cell stack which generates power using hydrogen-rich gas obtained from a vaporized source material generated by the vaporizer, the vaporizer generating the vaporized source material by applying heat to the liquid source material, and a device which supplies the liquid source material to the vaporizer, the method comprising:
detecting a power generation requirement of the fuel cell stack;
calculating a liquid source material supply amount to the vaporizer based on the power generation requirement;
calculating a prediction temperature of the vaporizer based on the supply amount of the liquid source material; and
controlling the liquid source material supply amount supplied by the supply device so as to prevent the prediction temperature from falling below a predetermined temperature.

* * * * *